United States Patent
Eisaman

(10) Patent No.: US 11,998,875 B2
(45) Date of Patent: Jun. 4, 2024

(54) SYSTEM AND METHOD FOR ELECTROCHEMICAL OCEAN ALKALINITY ENHANCEMENT

(71) Applicant: THE RESEARCH FOUNDATION FOR THE STATE UNIVERSITY OF NEW YORK, Albany, NY (US)

(72) Inventor: Matthew Eisaman, New York, NY (US)

(73) Assignee: The Research Foundation for The State University of New York York, Albany, NY (US)

( * ) Notice: Subject to any disclaimer, the term of this patent is extended or adjusted under 35 U.S.C. 154(b) by 0 days.

(21) Appl. No.: 18/266,672

(22) PCT Filed: Dec. 22, 2022

(86) PCT No.: PCT/US2022/053755
§ 371 (c)(1),
(2) Date: Jun. 12, 2023

(87) PCT Pub. No.: WO2023/122240
PCT Pub. Date: Jun. 29, 2023

(65) Prior Publication Data
US 2023/0390704 A1    Dec. 7, 2023

Related U.S. Application Data

(60) Provisional application No. 63/292,627, filed on Dec. 22, 2021.

(51) Int. Cl.
*B01D 61/44* (2006.01)
*B01D 61/46* (2006.01)
(Continued)

(52) U.S. Cl.
CPC ........... *B01D 61/445* (2013.01); *B01D 61/46* (2013.01); *C02F 1/4618* (2013.01);
(Continued)

(58) Field of Classification Search
CPC ...... B01D 61/445; B01D 2311/18; C02F 1/66
See application file for complete search history.

(56) References Cited

U.S. PATENT DOCUMENTS 3,265,607 A * 8/1966 Gregor ................. B01D 61/462
99/275
3,745,101 A   7/1973 Currey et al.
(Continued)

FOREIGN PATENT DOCUMENTS

CN    1169121 A    12/1997
CN    1373818 A    10/2002
(Continued)

OTHER PUBLICATIONS

International Search Report dated May 26, 2023 issued in PCT/US2022/053755.
(Continued)

*Primary Examiner* — Salil Jain
(74) *Attorney, Agent, or Firm* — Scully, Scott, Murphy & Presser, P.C.

(57) ABSTRACT

The disclosure relates to enhancing alkalinity of brine, e.g. seawater, using bipolar membrane electrodialysis (BPMED) without removing divalent cations that otherwise cause scaling. In one embodiment, a BPMED is employed wherein the brine volumetric flow rate through a basification compartment is greater at a given current density than that through a brine compartment which increases the pH of the brine output while keeping it below the precipitation pH. In one embodiment, the spacer located in the basification compartment is thicker than spacers elsewhere in the (Continued)

BPMED so as resist membrane distortion due to the increased hydrostatic pressure in the basification compartment given the greater volumetric flow. The brine output having increased alkalinity can be returned to the ocean to mitigate acidification and enable capture of atmospheric carbon dioxide.

18 Claims, 3 Drawing Sheets

(51) Int. Cl.

| | | |
|---|---|---|
| *C02F 1/44* | (2023.01) | |
| *C02F 1/461* | (2023.01) | |
| *C02F 1/469* | (2023.01) | |
| *C02F 1/66* | (2023.01) | |
| *C02F 103/06* | (2006.01) | |
| *C02F 103/10* | (2006.01) | |

(52) U.S. Cl.
CPC .............. *C02F 1/4693* (2013.01); *C02F 1/66* (2013.01); *B01D 2311/18* (2013.01); *B01D 2313/143* (2013.01); *B01D 2313/146* (2013.01); *B01D 2317/02* (2013.01); *C02F 1/441* (2013.01); *C02F 2001/4619* (2013.01); *C02F 2103/06* (2013.01); *C02F 2103/10* (2013.01); *C02F 2201/46115* (2013.01); *C02F 2201/46145* (2013.01); *C02F 2301/08* (2013.01)

(56) References Cited

U.S. PATENT DOCUMENTS

| | | |
|---|---|---|
| 3,878,086 A | 4/1975 | Haswell et al. |
| 3,993,517 A | 11/1976 | Schneider |
| 4,242,185 A | 12/1980 | McRae |
| 4,343,690 A | 8/1982 | De Nora |
| 4,586,993 A | 5/1986 | Thomas |
| 4,608,141 A | 8/1986 | Chlanda et al. |
| 5,240,579 A | 8/1993 | Kedem |
| 5,972,191 A | 10/1999 | Mani |
| 6,103,078 A | 8/2000 | Hitchems et al. |
| 6,294,066 B1 | 9/2001 | Mani |
| 7,662,267 B2 | 2/2010 | Carson et al. |
| 8,778,156 B2 | 7/2014 | Eisaman et al. |
| 8,784,632 B2 | 7/2014 | Eisaman et al. |
| 9,422,176 B2 | 8/2016 | Ng et al. |
| 9,527,753 B1 | 12/2016 | Harrison et al. |
| 9,586,181 B2 | 3/2017 | Eisaman et al. |
| 9,862,643 B2 | 1/2018 | Eisaman |
| 9,873,650 B2 | 1/2018 | Eisaman et al. |
| 9,914,644 B1 | 3/2018 | Eisaman |
| 9,914,683 B2 | 3/2018 | Eisaman |
| 9,915,136 B2 | 3/2018 | Eisaman et al. |
| 9,937,471 B1 | 4/2018 | Eisaman |
| 10,799,834 B2 | 10/2020 | McDonald et al. |
| 11,311,820 B2 | 4/2022 | McDonald et al. |
| 11,629,067 B1 | 4/2023 | Pelman et al. |
| 2001/0040093 A1 | 11/2001 | Mani |
| 2003/0079992 A1 | 5/2003 | Wilkins et al. |
| 2006/0286436 A1 | 12/2006 | Faghri et al. |
| 2013/0008792 A1* | 1/2013 | Eisaman .............. B01D 61/445 204/537 |
| 2015/0038750 A1 | 2/2015 | Weiss et al. |
| 2017/0341952 A1 | 11/2017 | Eisaman |
| 2017/0342328 A1 | 11/2017 | Eisaman et al. |
| 2018/0280882 A1 | 10/2018 | Hu et al. |
| 2019/0017183 A1 | 1/2019 | Cole et al. |
| 2020/0188852 A1 | 6/2020 | Diaz Nieto et al. |
| 2020/0189941 A1* | 6/2020 | Kumar .................. C02F 1/5245 |

FOREIGN PATENT DOCUMENTS

| | | |
|---|---|---|
| CN | 1177083 C | 11/2004 |
| CN | 1182036 C | 12/2004 |
| CN | 1771353 A | 5/2006 |
| CN | 102476031 B | 12/2014 |
| CN | 109772169 A | 5/2019 |
| CN | 109248565 B | 6/2020 |
| CN | 111954568 A | 11/2020 |
| CN | 107960062 B | 4/2021 |
| CN | 110038440 B | 7/2021 |
| CN | 113774234 B | 9/2022 |
| DE | 1934082 A1 | 9/1970 |
| DE | 1948113 B2 | 7/1978 |
| DE | 3005358 A1 | 9/1980 |
| DE | 3028970 C2 | 6/1993 |
| DE | 4418812 C2 | 3/1999 |
| DE | 10031018 A1 | 1/2002 |
| DE | 69735620 T2 | 8/2006 |
| EP | 0069504 A2 | 1/1983 |
| EP | 0121611 A2 | 10/1984 |
| EP | 0098500 B1 | 2/1987 |
| EP | 0081092 B1 | 6/1987 |
| EP | 0124007 B1 | 10/1987 |
| EP | 0503589 B1 | 10/1994 |
| EP | 0804277 B1 | 11/1998 |
| EP | 0984998 B1 | 9/2002 |
| EP | 2543427 B1 | 11/2015 |
| JP | H10305217 A | 11/1998 |
| JP | 3151043 B2 | 4/2001 |
| JP | 3151045 B2 | 4/2001 |
| JP | 2002528253 A | 9/2002 |
| JP | 2005539141 A | 12/2005 |
| JP | 2012505733 A | 3/2012 |
| KR | 850001577 B1 | 10/1985 |
| KR | 860001804 B1 | 10/1986 |
| KR | 960000014 B1 | 1/1996 |
| KR | 20150140347 A | 12/2015 |
| KR | 102412501 B1 | 6/2022 |
| WO | 1998013891 A1 | 4/1998 |
| WO | 2014121316 A1 | 8/2014 |
| WO | 2017112900 A1 | 6/2017 |
| WO | 2018237381 A2 | 12/2018 |
| WO | 2020077918 A1 | 4/2020 |

OTHER PUBLICATIONS

Written Opinion dated May 26, 2023 issued in PCT/US2022/053755.
YouTube—Intro Talk on Sea Mate on YouTube: https://www.youtube.com/watch?v=950SLzuAuCo; YouTube video posted approximately Nov. 2021.
YouTube video "Decreasing Ocean Acidification via Sea Mate: Safe Elevation of Alkalinity for the Mitigation of Acidification Through", Electrochemistry (https://www.youtube.com/watch?v=950SLzuAuCo), invited talk (remote), This is CDR series sponsored by The Open Air Collective, Sep. 7, 2021 (virtual).
"Electrochemical Ocean CDR: Current Status and Future Opportunities" (https://www.nationalacademies.org/event/01-27-2021 /a-research-strategy-for-ocean-carbon-dioxide-removal-and-sequestration-workshop-series-part-2—Minute 42: 12 of Workshop 2), National Academies of Sciences, Engineering, and Medicine Study entitled A Research Strategy for Ocean Carbon Dioxide Removal and Sequestration, Workshop 2 Technological Approaches (remote), Jan. 27, 2021, 3 pages.
YouTube video "What is Needed to Deploy and Scale Direct Ocean Capture?" (https://www.youtube.com/watch? v=PviW54JjCYQ), Invited Lightning Talk (remote), Smart Oceans 2020, Convergence Session IV: From Protection to Sustainable Utilization (co-presented with Dr. Brendan Carter, UW), Oct. 5, 2020.
"Ocean Visions' Experts to Advise/Evaluate Innovation Tackling Ocean Acidification", Atlanta, Georgia, Apr. 28, 2021, 3 pages.
YouTube video "Ocean carbon dioxide removal (CDR) via elecrochemistry—A ClimaeWorks production", Link: https://www.youtube.com/watch?v=MtJ_24aJ210—5 minute explainer video of electrochemical ocean carbon dioxide removal generally that Matt

(56) References Cited

OTHER PUBLICATIONS

Eisaman (Sea Mate project lead) helped make; Jul. 2021.
YouTube video https://www.youtube.com/watch?v=ecb_uAgBUUO—CDR EPO4: Ocean CDR Pathways with Catherine Jadot PhD and David Koweek Ph, presented by OpenAir; talk given my Matt Eisaman, Sep. 2021 (approximately).
Eisaman, Matthew D., article entitled "Negative Emissions Technologies: The Tradeoffs of Air-Capture Economics", CellPress, Joule 4, 516-520, Mar. 18, 2020, 5 pages.
Eisaman, Matthew D., et al., "Indirect ocean capture of atmospheric CO2 Part 11, Understanding the cost of negative emissions", Int. J. Greenh. Gas Control, 70, 254-261 (8 pages) 2018; plus Supplemental Information (16 pages).
De Lannoy, Charles-Francois et cl., "Indirect ocean capture of atmospheric CO2 Part I, Prototype of a negative emissions technology", Int J. Greenh. Gas Control, 70, 243-253 (11 pages) 2018); plus Supplemental Information (21 pages).
Eisaman, Matthew D., et al., "CO2 extraction from seawater using bipolar membrane electrodialysis", Energy & Environmental Science, 5, 7346-7352 (2012).
Pearson, R.J., et al., "Invited Paper: Energy Storage Via Carbon-Neutral Fuels Made From CO2 Water, and Renewable Energy", Proceedings of the IEEE, 100, 440-460 (21 pages), 2012.
Eisaman, M.D., et al., "CO2 desorption using high-pressure bipolar membrane electrodialysis", Energy & Environmental Science, 4, 4031-4037 (2011 ).
Eisaman, M.D., et al., "CO2 separation using bipolar membrane electrodialysis", Energy & Environmental Science, 4, 1319-1328 (2011).
Moras, C. A., et al., "Ocean Alkalinity Enhancement—Avoiding runaway CaCO3 precipitation during quick and hydrated lime dissolution", Biogeosciences, Preprint. Discussion started: Dec. 10, 2021, 31 pages.
Eisaman, M.D., et al., "Reducing Ocean Acidification and the Atmospheric Carbon Dioxide Concentration", Stonybrook University, College of Engineering and Applied Sciences, 2021, 1 page.

* cited by examiner

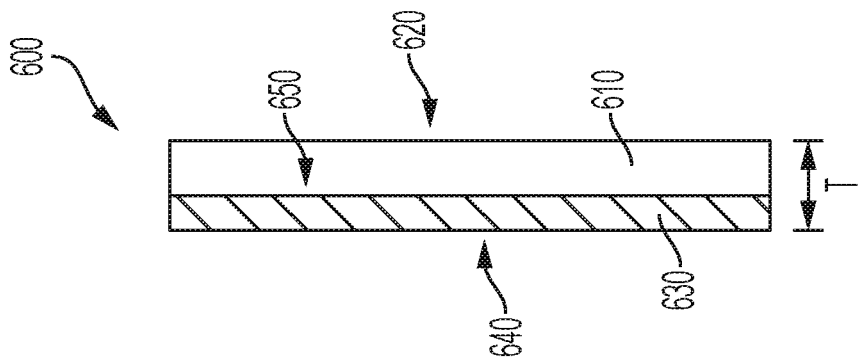
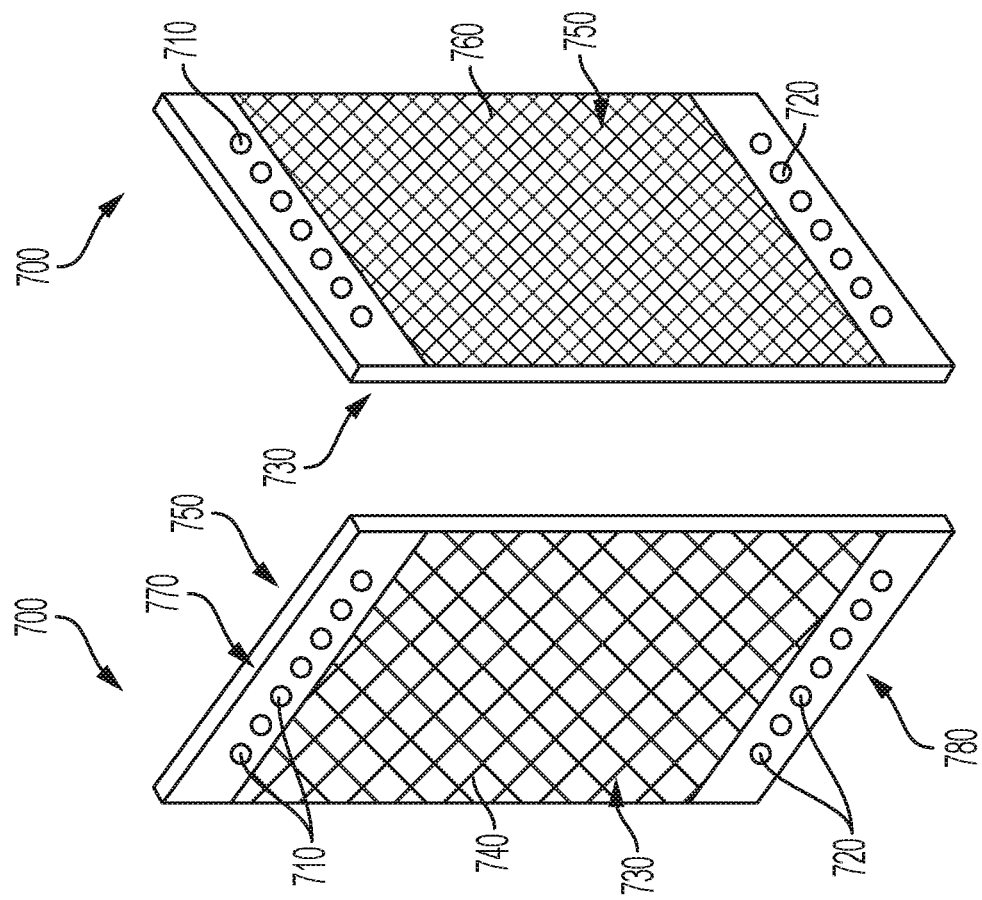
FIG. 3C
FIG. 3B
FIG. 3A

SYSTEM AND METHOD FOR ELECTROCHEMICAL OCEAN ALKALINITY ENHANCEMENT This application claims priority to U.S. Provisional Patent Application Ser. No. 63/292,627, filed Dec. 22, 2021, the entire contents of which are incorporated herein by reference.

FIELD

The disclosure pertains to a method and system for alkalinity enhancement of a fluid such as brine, e.g. seawater, the result of which can be utilized for negative emission carbon removal, including returning the alkaline-enhanced brine to the ocean to enhance the ability of the ocean to remove carbon dioxide from the air and store it in dissolved ionic form (bicarbonate and carbonate) in the ocean.

BACKGROUND

Alkaline enhancement of fluids such as brine include electrochemical ocean alkalinity enhancement (OAE), which relates to the use of electrochemistry to generate alkalinity, which alkalinity, in this instance, is added to the ocean, resulting in the mitigation of ocean acidification and the safe continued absorption of atmospheric $CO_2$ into the ocean as bicarbonate. Using the ocean to capture atmospheric $CO_2$ is commonly referred to as ocean carbon dioxide removal, or ocean CDR.

Typically, these electrochemical systems take in electricity and some brine stream (seawater, reverse osmosis concentrate, etc.) as input, the output being the constituent acid and base of the incoming salt, e.g., the NaCl in seawater is converted into HCl acid and NaOH base. Bipolar membrane electrodialysis (BPMED) is an electrochemical process that uses ion selective membranes between two end electrodes to generate HCl and NaOH from incoming NaCl— containing brine. If the resultant NaOH and seawater is returned to the ocean, this enhances the alkalinity of the ocean, mitigating ocean acidification and the increasing the ability of the ocean to remove $CO_2$ from the atmosphere and store it safely in dissolved ionic form (bicarbonate and carbonate) in the ocean; the resulting HCl can be kept on land for other purposes, such as commercial sale or improving the reaction rate and storage capacity of $CO_2$ mineralization reactors. Normally, the incoming brine streams to the BPMED, e.g., seawater or reverse osmosis concentrate, contain divalent cations of calcium ($Ca^{++}$) and/or magnesium ($Mg^{++}$). These divalent cations can form solid calcium and/or magnesium precipitates, such as $CaCO_3$ and/or $Mg(OH)_2$, as the pH increases. These precipitates can cause scaling on the BPMED membranes which in turn leads to higher energy consumption, shorter membrane lifetime, and often disruption of BPMED operation. Heretofore, the problem of scaling was addressed by removing these divalent cations prior to the BPMED, typically by pretreatments such as water softening treatment. However, these pretreatments are expensive and add to the complexity of operations.

There is thus a need for method and system to enhance the alkalinity of fluids such as brine without necessitating the removal of these divalent cations from the input stream to a BPMED.

SUMMARY

In one aspect, the disclosure is directed to a method for enhancing alkalinity comprising (i) providing a bipolar membrane electrodialysis device (BPMED) which comprises electrodes and at least one unit comprised of a brine compartment, an acid compartment, and a base compartment; (ii) flowing an aqueous brine solution through the base compartment at a first volumetric flow rate (fba) and through the brine compartment at a second volumetric flow rate (fbr), the aqueous brine solution comprising at least one divalent cation that precipitates out of the aqueous brine solution to form a solid precipitate when the aqueous brine solution is at or above a precipitating pH; (iii) applying a voltage between the electrodes at a current density to the BPMED device to form, in the base compartment, an enhanced alkaline brine product that has a pH higher than the pH of the brine but below the precipitating pH; (iv) maintaining, at the current density, the first volumetric flow rate through the base compartment at a rate sufficiently greater than the second volumetric flow rate through the brine compartment so as to keep the pH of the enhanced alkaline brine product formed in the base compartment below the precipitating pH; and (v) outputting the enhanced alkaline brine product from the base compartment.

In another aspect, the disclosure is directed to a system for enhancing alkalinity comprising a bipolar membrane electrodialysis device (BPMED) which comprises a cathode and an anode; and at least one unit comprising a brine compartment comprising a first cation exchange membrane, a brine compartment spacer, and an anion exchange membrane; a base compartment comprising a bipolar membrane, a base compartment spacer, and a second cation exchange membrane; and an acid compartment located between the brine compartment and the base compartment and comprising the opposite side of the anion exchange membrane, an acid compartment spacer, and the opposite side of the bipolar membrane; the base compartment spacer may be more rigid than the brine compartment spacer and the acid compartment spacer in cases where the base compartment spacer is thicker than the brine compartment spacer and the acid compartment spacer.

In another aspect, the method and system of the disclosure provide for electrochemical ocean alkalinity enhancement which produces "negative emission" carbon removal of very high quality at a reduced cost due to the avoidance of pretreatment to remove precipitating divalent cations.

In one practice, the flow-through design of the method and system permits the ability to feed seawater, or other aqueous brine solutions such as reverse osmosis concentrate, directly into the brine and base compartments without the need for pretreatment and removal of divalent cations such as $Ca^{++}$ and $Mg^{++}$.

BRIEF DESCRIPTION OF THE DRAWINGS

FIG. 3A is a schematic perspective view of an embodiment of a base compartment spacer of the disclosure. FIG. 3B is a schematic perspective view of the other side of the base compartment spacer embodiment of FIG. 3A. FIG. 3C is a schematic side view of another embodiment of a base compartment spacer of the disclosure.

DETAILED DESCRIPTION

The ensuing detailed description of certain embodiments of the disclosure is made with reference to the accompanying drawings and is not limited to the scope of the disclosure. Explanation about related functions or constructions known in the art are omitted for the sake of clearness in understanding the concept of the invention to avoid obscuring the invention with unnecessary detail.

As used herein, the term "about" indicates that the value listed may be somewhat altered, as long as the alteration does not result in nonconformance of the method or system herein described. For example, for some elements the term "about" can refer to a variation of ±0.1% for other elements, the term "about" can refer to a variation of ±1% to ±10%, or any point therebetween. As used herein, the term "substantially" or "substantial" is equally applicable when used in a negative connotation, and refers to a complete or near complete action, characteristic, property, state, structure, item, or result. For example, a surface that is "substantially" flat would either be completely flat or so nearly flat that the effect would be the same as if it were completely flat. Reference to any numerical range as used herein expressly includes each numerical value (including fractional numbers and whole numbers) encompassed by that range and including endpoints of that range. For illustrative purposes only, a reference to a range of "0.0001 to 5000" includes whole numbers such as 5000, 4999, 4998 . . . 3, 2, 1; and includes fractional numbers such as 0.00011, 0.00012 . . . 0.1, 0.2, 0.3 . . . 1.1, 1.2, 1.3 . . . 100.5, 100.6 . . . 4900.5, 4990.6, 4990.7.

Embodiments of the system and method described herein avoid removal of divalent cations prior to inputting the stream into the bipolar membrane electrodialysis unit, and provides a system and method for bipolar membrane electrodialysis specifically configured to take in brine with divalent cations as input.

Figure 1:
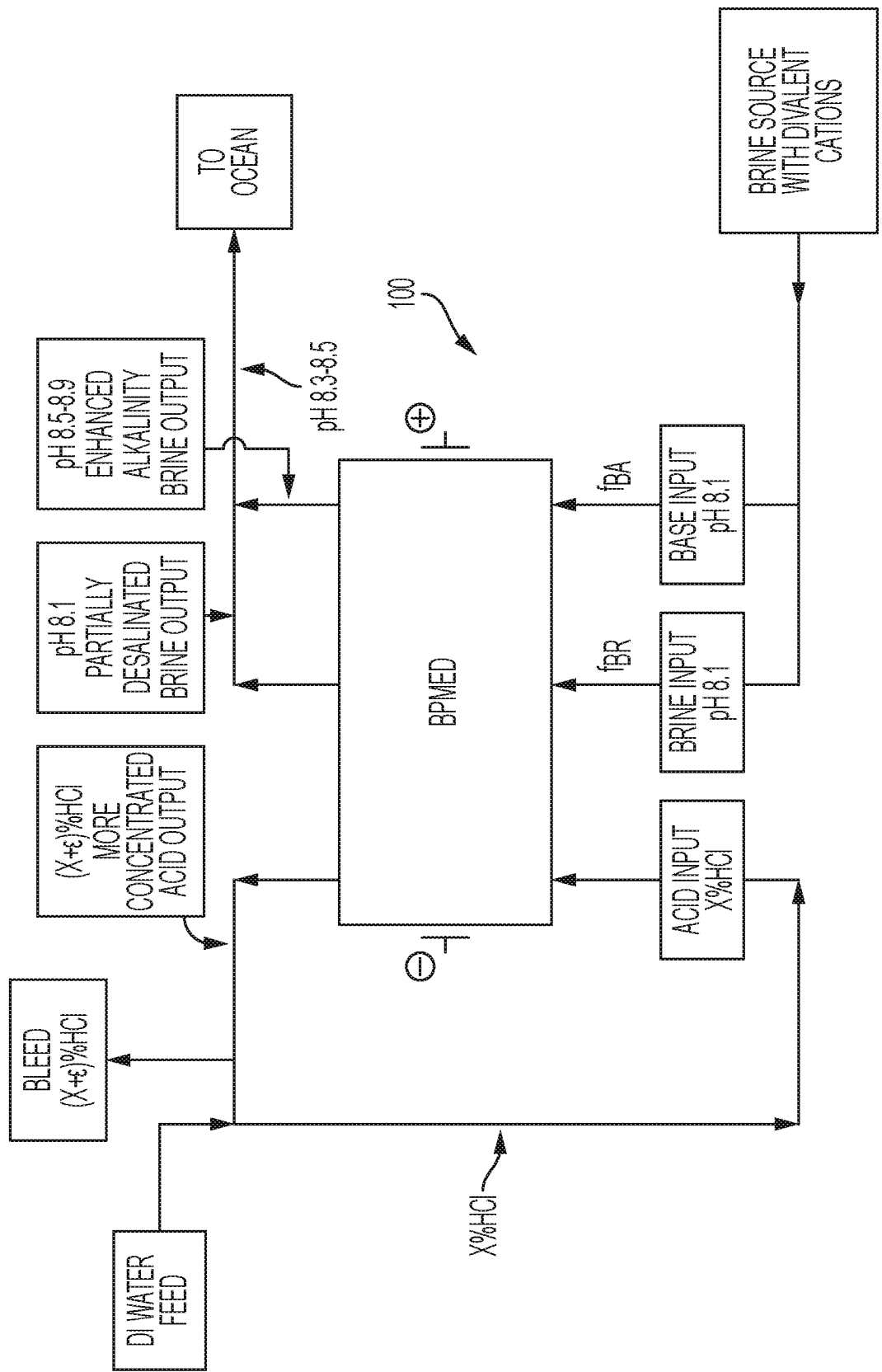
FIG. 1 is a schematic representation an embodiment of the method and of a BPMED system and method of the disclosure.
Figure 2:
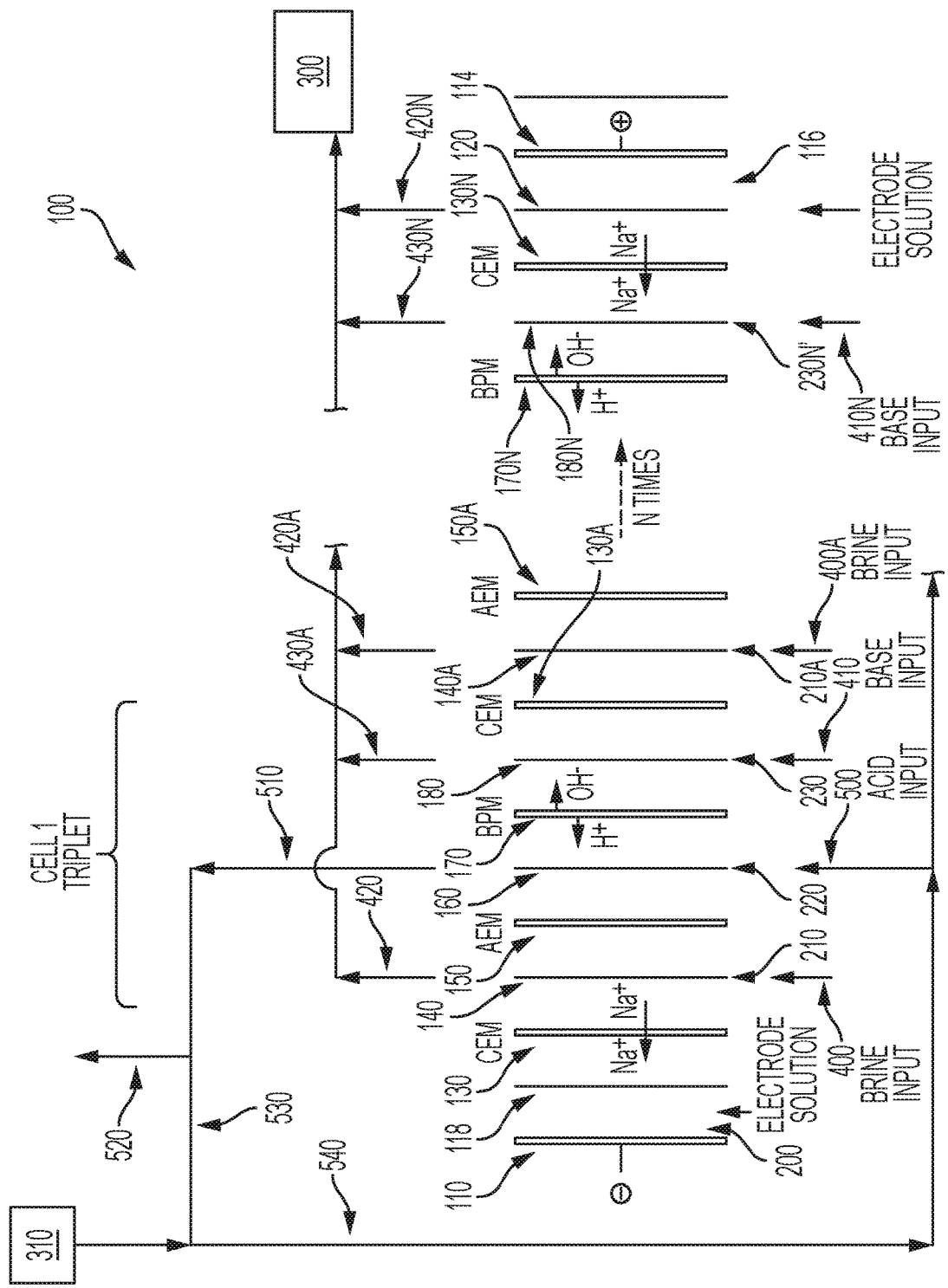
FIG. 2 is a schematic cross section of the embodiment of the BPMED system of FIG. 1.

FIG. 1 depicts a schematic representation of a method and system for enhancing the alkalinity of an aqueous brine solution, which term as used herein includes without limitation salt water such as seawater, brackish water, brine derived from desalination processes or a mined salt such as e.g. sodium and/or potassium bicarbonate and/or carbonate dissolved to make a brine solution. FIG. 1 (and FIG. 2) shows bipolar membrane electrodialysis device (labeled as BPMED) and a cathode and anode, the BPMED comprises, in the embodiment shown left to right, at least one acid compartment, brine compartment, and base compartment (FIG. 2). In the practice shown in FIG. 1, the input to the brine compartment ("Brine Input") and the base compartment ("Base Compartment") are the same, i.e. they are both from the same brine source, e.g. some form of aqueous brine stream, including possibly seawater (having a salinity of about 35) from the ocean or from a reverse osmosis concentrate brine (having a salinity of about 70) which can derive from a desalination plant, or the brine source can be from some other brine stream or process. In one practice, the brine source is the ocean and the enhanced alkalinity brine product stream is returned to the ocean to mitigate ocean acidification. In one embodiment, the enhanced alkalinity brine product stream is combined with the partially desalinated brine output stream for return to the ocean.

In FIG. 1, the pH of the brine input and base input is shown to be 8.1, but the pH for either or both inputs can be in the range pH 6 to 8.5. Hitherto, the brine input and base input flows, such as seawater or reverse osmosis concentrate, had to be pretreated to remove divalent cations of e.g. calcium ($Ca^{++}$) and/or magnesium ($Mg^{++}$), as the presence of these cations at the high pH values typically encountered in the base compartments of a BPMED unit, e.g., as high as pH of 14, results in precipitation of solid $Mg(OH)_2$ and $CaCO_3$ on the membranes within the BPMED, which in turn greatly reduces performance. In the flow-through system and method depicted in FIG. 1 no removal of these types of divalent cations occurs or is needed because the volumetric flow rate ($f_{BA}$) of the base input through the base compartment is sufficiently large enough relative to the movement of $OH^-$ ions, due to the applied current density when a voltage is applied across the electrodes, to keep the maximum pH in the base compartment (as measured at the base compartment output) to the range 8.5 to 8.9, which is below the pH whereby the precipitation of $Mg(OH)_2$ and $CaCO_3$ solids, as well as other solids, occurs so as to eliminate the need to remove the pertaining divalent cations. For typical operational values of current density, this is accomplished in FIG. 1 by making the volumetric flow rate through the base compartment sufficiently large relative to the volumetric flow rate through the brine compartment ($f_{BR}$), i.e. $f_{BA} > f_{BR}$, such that the pH of the enhanced alkaline brine product formed in the base compartment remains below the precipitating pH. At a given volumetric flow rate through the base compartment, this can also be accomplished by keeping the current density sufficiently low to keep the base compartment pH below the precipitation threshold.

In the flow-through configuration shown in FIG. 1, the acid stream is in a "feed-and-bleed" configuration. As shown, the concentration of the aqueous acid input to the acid compartment channel is constant, denoted as X % HCl. After passing through the acid compartment of the BPMED unit, the output acid concentration is increased to (X+C) % HCl (labeled "more concentrated acid output"). In the practice shown, there is then a bleed off of some portion of this (X+C) % HCl higher concentration product acid. The rate at which the high concentration acid is bled off is matched by the rate of feed of deionized water (DI water), which configuration results in a constant concentration of X % HCl at the acid input. While "DI water" is depicted in FIG. 1, this feed can be an aqueous brine solution, such as seawater, or other aqueous solutions in the cases where the product is HCl in brine, e.g. seawater, or other aqueous solutions rather than DI water. The bleed-off HCl at a concentration of (X+C) % HCl can be recovered for other uses including commercial sale, or improving the reaction rate and storage capacity of $CO_2$ mineralization reactors.

Referring to FIG. 2, there is a schematic cross section of an embodiment of a BPMED system utile in FIG. 1 showing electrodialysis unit 100 which comprises at least one cell triplet (Cell 1) that includes a brine compartment 210, an acid compartment 220, and a base compartment 230, but can comprise a plurality of "N" such cell triplets in series, e.g. up to 100 cells or more, having brine compartments 210, 210A . . . up to 200N when in series, acid compartments 220, 220A . . . 200N (neither shown) each triplet in the configuration depicted. Unit 100 comprises cathode 110 and anode 114 with respective electrode compartments 200 and 116 having end cap membranes 118 and 120 that separate the electrode compartments from the BPMED membrane cells and which can each individually comprise a sulfonated tetrafluorethylene-based fluoropolymer-copolymer, commercially available as Nafion®. Electrodes 110 and 114 can comprise materials known in the art, e.g. nickel. It will be understood that multiple configurations are possible in terms of which membranes depicted in FIG. 2 are adjacent the respective electrodes and that the configuration shown in FIG. 2 in this regard is representative only. In one practice, an electrode solution, e.g. an aqueous sodium hydroxide (NaOH) solution, is flowed through electrode compartments 200 and 116; in this practice, positively charged electrode 114 will cause sodium ions ($Na^+$) to move across end cap membrane 120, and negatively charged electrode 110 will attract the sodium ions to electrode compartment 200. Other suitable electrode solutions include sodium sulfate that has adjusted been adjusted to be acidic by the addition of sulfuric acid or adjusted to be basic by the addition of sodium hydroxide.

In the embodiment shown in FIG. 2, brine compartment 210 is defined by cation exchange membrane (CEM) 130 and anion exchange membrane (AEM) 150 (which when these or other elements of the BPMED are multiply present and are in series are denoted e.g. with letter suffixes e.g. 130, 130A . . . 130N; 150, 150A . . . 150N, etc.) Serviceable CEMs include monovalent-cation permselective membranes as known in the art, e.g. without limitation those commercially available as Neosepta CMX-S. Serviceable AEMs include monovalent-anion permselective membranes as known in the art, e.g. without limitation those commercially available as Neosepta ACS. Brine compartment 210 also comprises brine compartment spacer 140 which can comprise spacers known in the art, e.g. polymers such as polyolefins, including polypropylene, or silicone compounds, and which can be woven or non-woven, and can be of the same or similar outer dimensional size as the CEM 130 and AEM 150, and have a thickness of about 0.15 to about 1.5 mm. Acid compartment 220 is defined by the opposite side of AEM 150 and by bipolar membrane (BPM) 170. Serviceable BPMs for use herein include those known in the art, e.g. without limitation those commercially available as Neosepta BP-1E. Acid compartment 220 also comprises acid compartment spacer 160 which can comprise the same material of construction and size as base compartment spacer 140; in one practice the base compartment spacer and the acid compartment spacer are substantially identical to avoid or minimize hydrostatic pressure differentials that would otherwise occur across the membranes due to volumetric flow rates through the adjacent compartments. Generally, when a voltage is applied across unit 100 by electrodes 110, 114, water dissociation inside a BPM results in the transport of hydrogen ions ($H^+$) from one side of the BPM, and hydroxyl ions ($OH^-$) from the opposite side. In regard to AEMs/CEMs, these permit transport of negatively/positively charged ions through the membrane.

Base compartment 230 is defined by the opposite side of BPM 170 and CEM 130A. Cation exchange membrane 130A can be different from or preferably the same as CEM 130. In one embodiment, base compartment spacer 180 is more rigid than the brine and the acid compartment spacers 140 and 160. This is to minimize or prevent unwanted hydrostatic pressure differentials when the BPMED is in operation. In one embodiment, the side of the base compartment spacer 180 proximate bipolar membrane 170 is configured to be more rigid than the side of the base compartment spacer 180 that faces opposite the bipolar membrane 170, e.g. by comprising a more rigid backing on that side as compared, e.g. to the interior of spacer 180. In addition, or separately in this regard, the base compartment spacer 180 can have a thickness greater than the thickness of the brine compartment spacer 140 and greater than the thickness of the acid compartment spacer 160, e.g. the base compartment spacer 180 can be up to 10 times the thickness of the brine and acid compartment spacers 140, 160, which spacers 140 and 160 can have the same thickness. Base compartment spacer 180 can comprise a woven polyolefin, such as polypropylene, or silicone, and can be configured as a mesh. Embodiments of various base compartment spacers are depicted in FIG. 3.

Operationally, in one non-limiting practice and with reference to FIG. 1, an aqueous brine solution is flowed through the base compartment 230 (Base Input) at a first volumetric flow rate (fba), and through the brine compartment 210 (Brine Input) at a second volumetric flow rate (fbr). The aqueous brine solution comprises at least one divalent cation that precipitates out of the aqueous brine solution to form a solid precipitate when the aqueous brine solution is at or above a precipitating pH; representative divalent cations include calcium ($Ca^{++}$), magnesium ($Mg^{++}$), or both; and representative solid precipitates include $CaCO_3$, $Mg(OH)_2$, or both. The presence of such divalent cations of Ca and Mg can be naturally occurring, as in seawater and brackish water. The aqueous brine solution that flows to the brine compartment 210 (Brine Input) can be the same or different, e.g. seawater, reverse osmosis concentrate brine, and the like as the aqueous brine solution that flows to the base compartment 220 (Base Input); and each of the Brine Input and Base Input can be from the same or different brine source, which brine source can comprise, e.g. a natural body of seawater (such as the ocean) or a source comprising a mined salt dissolved to make an aqueous brine solution. The aqueous brine solution can be flowed in separate lines from the brine source to each of the brine and/or base compartments 210, 220 individually, or it can be flowed in a common line that branches to feed the respective brine and the base compartments 210, 220 as depicted in FIG. 1.

A voltage is applied between electrodes 110 and 114, the voltage providing a current density to the BPMED 100 whereby an enhanced alkaline brine product is formed in the base compartment 230 (and as understood herein, in base compartments 230A . . . 230N when cells in series are used), the enhanced alkaline brine product having a pH that is higher than the pH of the aqueous brine solution feed (Base Input), but below the precipitating pH of the aqueous brine solution feed containing the one or more divalent cation. One embodiment for achieving this comprises maintaining, at the current density, the first volumetric flow rate (fba) through the base compartment 230 at a rate sufficiently greater than the second volumetric flow rate (fbr) through the brine compartment 210 so as to keep the pH of the enhanced alkaline brine product formed in the base compartment 230 below the precipitating pH. In one practice, the first volumetric flow rate (fba) through the base compartment 230 is about 1 to about 10 times greater than the second volumetric flow rate (fbr) through the brine compartment 210. As shown in FIG. 2, the brine compartment 210, the acid compartment 220, and the base compartment 230 are included in a cell triplet (Cell 1 Triplet); in one practice, the BPMED 100 comprises a plurality of cell triplets in series (Cell 1 Triplet . . . Cell N Triplet (not shown)). In one embodiment, the voltage and current density applied across the electrodes to achieve the alkalinity enhancement above is about 1V to about 4V per cell triplet, and the current density is about 5 $mA/cm^2$ to about 120 $mA/cm^2$. In one embodiment, the voltage is used as an early indicator to signal the need for a rapid clean in place by flushing a portion of the generated acid 510 or 540 through all compartments; the pH of the output during this cleaning can be used to improve the voltage feedback signal.

Without limitation, typical values for pH of the aqueous brine solution feed for the Brine Input 400 (and Brine Inputs 400A . . . 400N, not shown, for cells in series) and for Base Input 410 (and Base Input 410A . . . 410N for cells in series) is between about 6 to about 8.5, e.g. pH of 8.1. Typical precipitation pHs for an aqueous brine solution feed input comprising divalent cations of calcium and/or magnesium can be as high as pH of 14, e.g. pH of 9 and higher. Without limitation, typical values for pH of the partially desalinated brine output 420 (420A . . . 420N for cells in series) from the brine compartment 210 (210A . . . 210N, not shown, for cells in series) is the same as the input 410 and is between about 6 to about 8.5. Typical values for the enhanced alkaline brine product 430A (up to 430N for cells in series that is outputted from base compartment 230 (230A . . . 230N for cells in series) is between about 8.5 to about 8.9. In one practice, the first volumetric flow rate (fba) through the base compartment 230 as compared to current density is such that the pH of the base compartment 230 does not exceed 8.5

In one embodiment (not shown), at least a portion of the enhanced alkaline brine product 430A outputted from the base compartment 230 is directly flowed to a final destination 300, which can include a body of seawater, e.g. the ocean, or which involve other processing. In another embodiment as depicted in FIG. 2, a portion or all of the partially desalinated brine product 420 that is formed in and outputted from the brine compartment 210 is combined with all or at least a portion of the enhanced alkaline brine product 430A outputted from the base compartment 230 and the combined streams are flowed to final destination 300, e.g. the ocean. In one embodiment (not shown), a portion or all of the partially desalinated brine product 420 formed in and outputted from the brine compartment 210, comprises all or a portion of the feed 410 (Base Input) to base compartment 230.

As shown in FIG. 2, an aqueous stream 500 comprising a first concentration of HCl (X % HCl) is flowed into the acid compartment 220, and an acidified product 510 having a second concentration of HCl, denoted as (X+C) % HCl, wherein C represents the increase in concentration, which is greater than the first concentration is formed in and outputted from the acid compartment. In one embodiment, a portion of the acidified product stream 510 is bled off as 520. A water stream 310, which can comprise deionized water or an aqueous brine solution, is fed to stream 530 which comprises the acidified product at concentration (X+C) % HCl that was not bled off, at a rate and quantify sufficient to form stream 540 having the first concentration of X % HCl which then provides the acid input feed 500 to acid compartment 220. As will be understood, when BPMED unit 100 comprises a plurality of cell triplets, this feed-and-bleed technique can be applied to all acid compartments 220 (up to 200N, not shown). In one practice, a first portion of stream 540 is recovered as an HCl product having an HCl concentration of about 0.1M to about 1M; and a second portion of stream 540 is flowed into acid compartment 220 as acid input feed. In another embodiment, bleed off stream 520 comprising the second concentration of (X+C) % HCl is recovered as product or to serve as feed for other processes.

In another embodiment of the disclosure as shown in FIG. 2 the system for enhancing alkalinity comprising a bipolar membrane electrodialysis device (BPMED) 100 and which comprises a cathode 110 and an anode 114; and at least one unit, or cell triplet, comprising a brine compartment 210 comprising a first cation exchange membrane 130, a brine compartment spacer 140, and an anion exchange membrane 150; a base compartment 230 comprising a bipolar membrane 170, a base compartment spacer 180, and a second cation exchange membrane 130A; and an acid compartment 220 located between the brine compartment 210 and the base compartment 230 and which comprises the opposite side of anion exchange membrane 150, an acid compartment spacer 160, and the opposite side of bipolar membrane 170. In one practice, as shown in FIG. 2, the acid compartment 220, the brine compartment 210, and the base compartment 230, each individually comprise an inlet and an outlet and each are individually configured for flow-through operation. The system shown in FIG. 2, can further comprise one or more flow controllers (not shown) as known in the art to maintain a volumetric flow rate through the base compartment at a rate greater than the volumetric flow rate through the brine compartment. The BPMES of the system can comprise one or a plurality of cell triplets in series.

The base compartment spacer 180 is as rigid as or more rigid than the brine compartment spacer 140 and/or the acid compartment spacer 160. In one practice, the base side of the base compartment spacer 180 proximate the bipolar membrane 170 is configured to be more rigid than the side of the base compartment spacer opposite the bipolar membrane, the base compartment spacer then being more rigid than brine and acid compartment spacers 140 and 160. Additionally or separately, the base compartment spacer 180 has a thickness greater than the thickness of the brine compartment spacer 140 and greater than the thickness of the acid compartment spacer 160. In this regard, acid compartment spacer 160 and the brine compartment spacer 160 can have the same or different thicknesses. Typical thickness for each of the acid compartment spacer 160 and the brine compartment spacer 140 is between about 0.5 to about 1.2 mm. In one practice, the base compartment spacer 180 has a thickness up to 10 times the thickness of the acid and brine compartment spacers. Without limitation, base compartment spacer 180 can comprise a woven polypropylene or silicone mesh.

Referring to FIGS. 3A, 3B, and 3C thereat is depicted an embodiments of a spacer useful as a base compartment spacer. In FIGS. 3A and 3B, spacer 700 comprising a first side 730 and a second side 750 which is opposite the first side. As shown, the spacer 700 is substantially rectangular, although other geometries are contemplated, and has a first end 770 and a second end 780. The spacer can also comprise through holes 710 and/or 720 to permit fluid flow in the respective compartment. In one practice, the first side 730 has a first mesh pattern 740 and the second side 750 a second mesh pattern 760 and at least a portion of the openings in the first mesh pattern 740 having a larger open area than the open area in the second mesh pattern 760, which as depicted has a tighter, closer mesh. The openings of the first mesh pattern 740 can be uniform or non-uniform over the first side 730. In one embodiment, the larger open area and mesh design of the first mesh pattern 740 is configured to eliminate inhomogeneous high-pH hotspots near the spacer membrane surface. In one embodiment the openings in the first mesh pattern 740 are configured to provide less fluid resistance than the openings in the second mesh pattern 760. In one practice, the openings of the first mesh pattern 740 get larger toward the first end 770. The first and second mesh patterns 740, 760 can each individually comprise a woven polymer mesh, e.g. from a polyolefin such as polypropylene, or a silicone mesh. The woven mesh can comprise an over-lapping or non-overlapping pattern. At FIG. 3C is another embodiment of a spacer 600 for use in a base compartment. Spacer 600 comprises body 620 which can comprise a mesh as hereinabove described, a first side 650 and a second side 620, and which comprises a rigid backing 630 on top of the first side 650; the rigid backing can be integral with or adhered to the first side. Rigid backing 630 can also be near the membrane surface (not shown) and be more rigid as compared to the interior of the spacer. As shown, rigid backing 630 comprises a face 640 that would be situated proximate a bipolar membrane when used in a base compartment of a BPMED. The rigid backing can be used in conjunction with the open mesh embodiment of FIGS. 3A and 3B. In another practice, spacer 600 comprises thickness T which is up to 10 times the thickness of corresponding spacers used in the brine and acid compartment of a BPMED. Without limitation, thickness T can range from about 2 mm to about 12 mm.

EXAMPLE

Preliminary tests were performed to demonstrate that keeping the pH of the base compartment below 8.7 prevents precipitation of solids within the BPMED system even in the presence of divalent ions like Ca++ and Mg++. The BPMED system comprised an acid tank, a base tank, and a brine tank, and was run in batch mode. The inputs to the BPMED were drawn from these tanks, sent through their respective paths in the BPMED system and then returned to the same tanks. In batch mode, the acid continues to become more acidic over time, the base continues to become more basic over time, and the brine continues to become less salty over time. Table 1 below shows data from this test. The starting solutions were 0.5M NaCl in the acid and brine compartments, and 0.5M "Instant Ocean" in the base compartment. Instant Ocean, is a commercially available salt mixture designed to mimic seawater that contains divalent cations like Ca++ and Mg++ at approximately the same concentration as seawater. Each row below represents the current and voltage measured on the BPMED system during a 10 second interval when the electrical current was applied. In between these times, the acid, brine, and base solutions continued to flow but without the application of electrical current. This allowed each tank to fully mix after the application of current so that the pH in each of the tanks was homogenous. The pH values listed are the values after the pH has stabilized. The indicator of the start of precipitation in the system is that at a given constant current density, the voltage will start to increase due to the formation of solid precipitate on the membranes. The data below show that the voltage remains constant at a constant current value for 110 minutes while exposed to pH values up to 8.69 in the base compartment despite the fact that the base solution was seawater without removal of divalent cations. These data indicate that keeping the pH sufficiently low such as in the flow through invention will allow the use of seawater without the need for pretreatment.

| Voltage (V) | Current (A) | Time (min) | Base pH |
|---|---|---|---|
| 7 | 0.1 | 0.83 | 8.05 |
| 10 | 0.3 | 1 | 8.05 |
| 10 | 0.3 | 10 | 8.27 |
| 10 | 0.3 | 15 | 8.36 |
| 10 | 0.3 | 20 | 8.41 |
| 10 | 0.3 | 52 | 8.5 |
| 10 | 0.3 | 74 | 8.51 |
| 10 | 0.3 | 90.5 | 8.61 |
| 10 | 0.3 | 96 | 8.67 |
| 10 | 0.3 | 110 | 8.69 |

What is claimed is:

1. A method for enhancing alkalinity comprising:
   (i) providing a bipolar membrane electrodialysis device (BPMED) which comprises electrodes and at least one unit comprised of a base compartment, an acid compartment, and a base compartment;
   (ii) flowing an aqueous brine solution through the base compartment at a first volumetric flow rate (fba) and through the brine compartment at a second volumetric flow rate (fbr), the aqueous brine solution comprising at least one divalent cation that precipitates out of the aqueous brine solution to form a solid precipitate when the aqueous brine solution is at or above a precipitating pH;
   (iii) applying a voltage between the electrodes at a current density to the BPMED device to form, in the base compartment, an enhanced pH alkaline brine product that has a pH higher than the pH of the brine but below the precipitating pH;
   (iv) maintaining, at the current density, the first volumetric flow rate through the base compartment at a rate sufficiently greater than the second volumetric flow rate through the brine compartment so as to keep the pH of the enhanced pH alkaline brine product formed in the base compartment below the precipitating pH; and
   (v) outputting the enhanced pH alkaline brine product from the base compartment.

2. The method of claim 1 wherein the aqueous brine solution flowing to the base compartment and flowing to the brine compartment is from a brine source, which brine source is the same or a different source for each of the base compartment and the brine compartment individually.

3. The method of claim 2 wherein the aqueous brine solution is flowed directly from the brine source to the base compartment, flowed directly to the brine compartment, or flowed directly to both.

4. The method of claim 1 wherein the aqueous brine solution comprises seawater, reverse osmosis concentrate brine, or both.

5. The method of claim 2 wherein the brine source is a natural body of seawater or a mined salt dissolved to make an aqueous brine solution.

6. The method of claim 1 wherein the divalent cation is selected from the divalent cation of calcium (Ca), magnesium (Mg), or both; and the precipitate is selected from $CaCO_3$, or $Mg(OH)_2$, or both.

7. The method of claim 1 wherein the pH of the brine is about 6 to about 8.5; the precipitating pH is about 8.9 or above; and the pH of the enhanced pH alkaline brine product is about 8.5 to about 8.9.

8. The method of claim 1 wherein the first volumetric flow rate is greater than 1 to about 10 times greater than the second volumetric flow rate.

9. The method of claim 1 wherein least a portion of the enhanced pH alkaline brine product outputted from the base compartment is flowed into a body of seawater.

10. The method of claim 1 wherein a partially desalinated brine product is formed in and outputted from the brine compartment, and at least a portion of the desalinated brine product outputted from the brine compartment is combined with at least a portion of the enhanced pH alkaline brine product outputted from the base compartment.

11. The method of claim 1 wherein a partially desalinated brine product is formed in and outputted from the brine compartment, and at least a portion of the desalinated brine product outputted from the brine compartment is inputted to the base compartment.

12. The method of claim 10 wherein the combination of the partially desalinated brine product and the enhanced pH alkaline brine product are flowed into a body of seawater.

13. The method of claim 10 wherein the desalinated brine product outputted from the brine compartment has a pH of about 8.5 or lower; and the pH of the combined desalinated brine product and the enhanced alkaline brine product is about 8.1 to about 8.9.

14. The method of claim 1 wherein the brine compartment, the acid compartment, and the base compartment are included in a cell triplet and the BPMED comprises a plurality of cell triplets in series, and wherein the voltage applied across the electrodes is about 1V to about 4V per cell triplet, and the current density is about 5 mA/cm$^2$ to about 120 mA/cm$^2$.

15. The method of claim 1 wherein an aqueous stream comprising a first concentration of HCl is flowed into the acid compartment, and an acidified product having a second concentration of HCl greater than the first concentration is formed in and outputted from the acid compartment.

16. The method of claim 15 wherein the aqueous stream comprises a combination of at least a portion of the acidified product outputted from the acid compartment and a water feed.

17. The method of claim 16 wherein the water feed comprises deionized water or brine.

18. The method of claim 16 wherein a first portion of the aqueous stream is recovered as an HCl product having an HCl concentration of about 0.1M to about 1M and a second portion of the aqueous stream is flowed into the acid compartment.

\* \* \* \* \*